United States Patent [19]

Kinnard

[11] Patent Number: 4,789,220
[45] Date of Patent: Dec. 6, 1988

[54] STEREOSCOPIC PRINT VIEWER

[76] Inventor: Wolcott Kinnard, 2564 N. 124th St. Apt. 407, Wauwatosa, Wis. 53226

[21] Appl. No.: 41,989

[22] Filed: Apr. 24, 1987

[51] Int. Cl.$^4$ .................... G02B 27/04; G02B 27/22
[52] U.S. Cl. ................................. 350/139; 350/140; 350/142; 350/143; 350/250
[58] Field of Search ............... 350/139, 140, 142, 143, 350/133, 130, 250

[56] References Cited

U.S. PATENT DOCUMENTS

| | | | |
|---|---|---|---|
| 774,245 | 11/1904 | Hermann | 350/142 |
| 1,194,057 | 8/1916 | Murphy | 350/140 |
| 1,197,679 | 9/1916 | Stern | 350/140 |
| 1,257,327 | 2/1918 | Disney | 350/140 |
| 1,392,327 | 10/1921 | Hattersley | 350/140 |
| 2,621,562 | 12/1952 | Stone | 350/140 |

Primary Examiner—Jon W. Henry

[57] ABSTRACT

The improved stereoscopic print viewer provides a simple interoccular adjustment to permit maximum comfortable magnification. A new method of focusing and holding the prints gives minimum viewer size. A variable focus adjustment automatically locks in place. The method of holding the prints positions them in close optical alignment, and requires minimum size. Prints are provided with a notch mating with a boss in the print holder. Special print borders are provided for an improved stereoscopic "window".

The lenses follow the optical system devised by Oliver Wendall Holmes, but fold compactly together when not in use, with each lens on a pivot with means to index it properly into a viewing position.

Each lens can also be indexed further to provide a hand held magnifier with the power of one lens, or, by indexing the other lens to a matching position, twice the magnifying power is obtained.

The entire assembly is mounted on a center plate which positions and holds the viewer elements and which acts as a light baffle to separate the stereoscopic pairs in viewing.

10 Claims, 3 Drawing Sheets

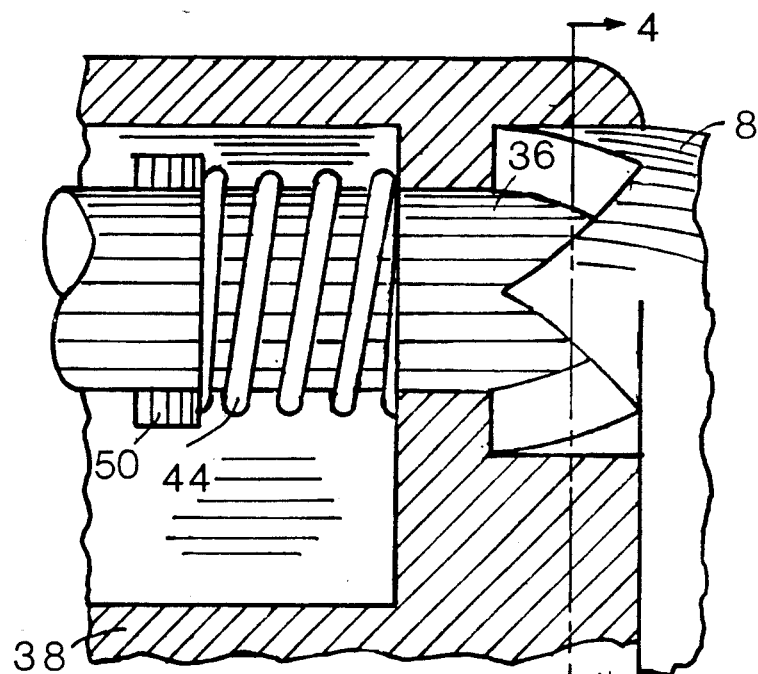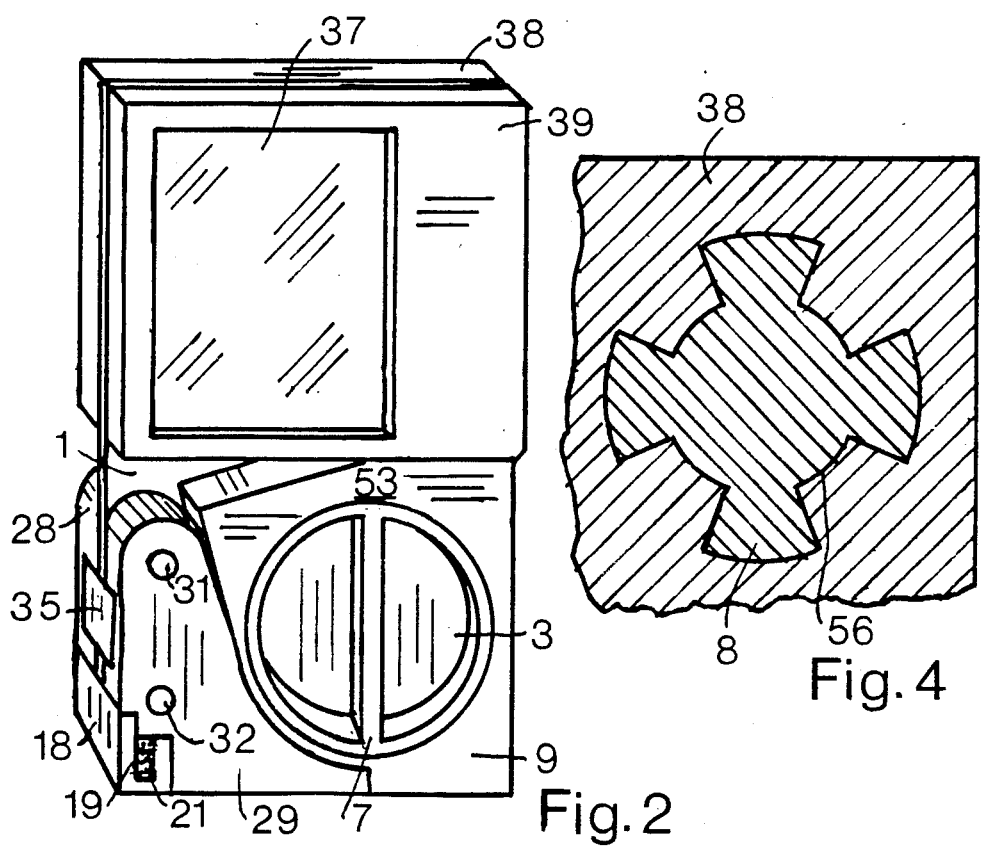

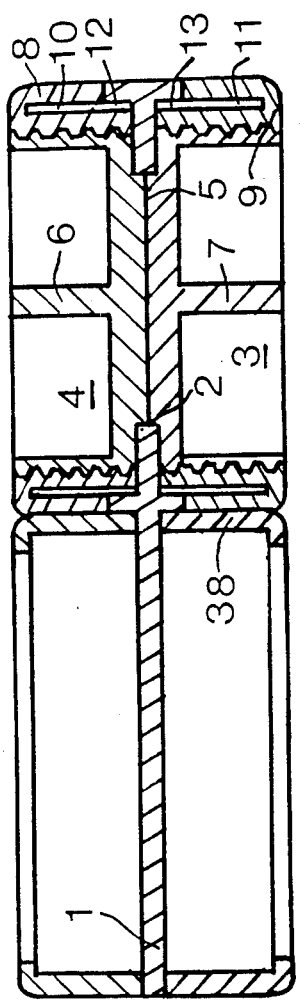
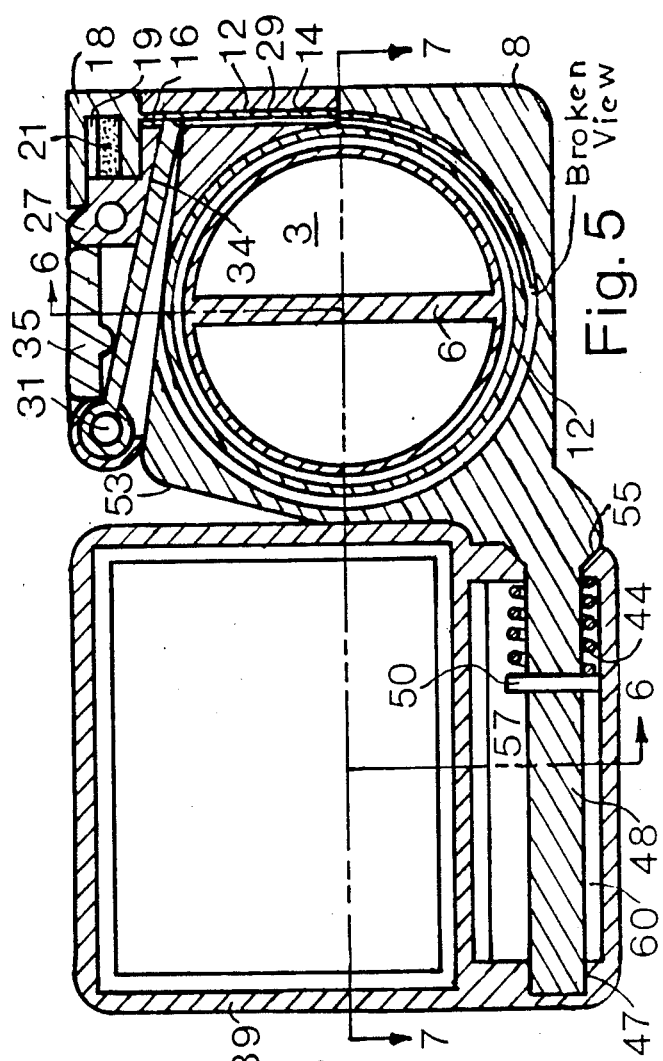
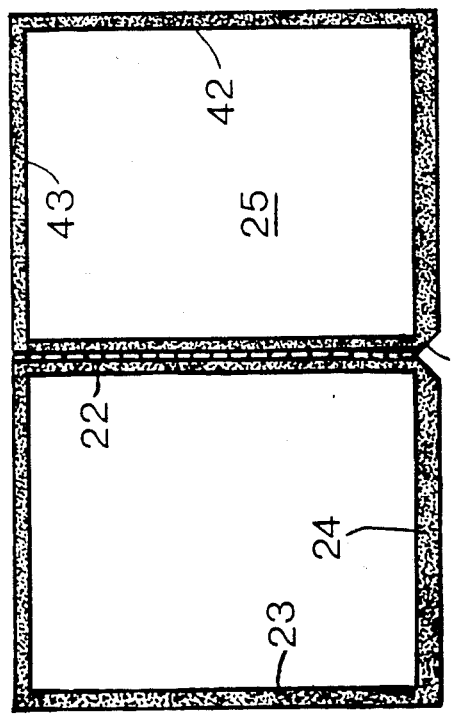
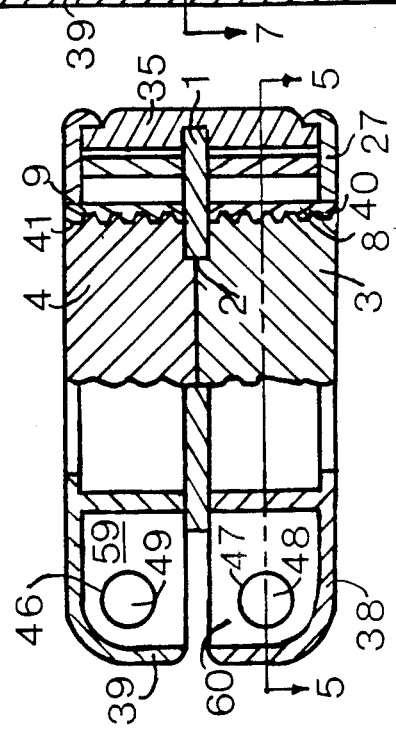

STEREOSCOPIC PRINT VIEWER

TECHNICAL FIELD

This invention is for an improved device with which to view stereoscopic prints by reflected light. The viewing or projection of transparencies is an unrelated field. Holograms have no application. Methods are available to produce stereoscopic prints which can be seen without a viewer, but these prints have disadvantages, and since they are irrelevant to the subject here, they are not being discussed.

BACKGROUND ART

During the latter part of the nineteenth century stereoscopic print viewers were in wide use, mostly with photographs produced professionally. Cameras available for general use were far from satisfactory. Most print viewers were large and not well suited for use outside of home or school. More compact viewers had shortcomings in performance.

In order to take fullest advantage of my stereoscopic cameras, U.S. Pat. No. 3,045,572, I have invented this viewer for optimum performance, compact, and convenient, which can be produced at low cost.

The most simple print viewer requires each print to be no wider than the minimum interoccular distance of users. This print size, less than 2 ½ inches wide, limits the important social interaction between persons examining the prints in two dimensions, without a viewer, According to historical references, the original stereoscope without mirrors was invented by Brewster. Oliver Wendall Holmes invented using lenses off-center, with the lens centers outward from the viewer center, to act as prisms, permiting viewing of prints somewhat wider than ½ inches. I cannot find patents on either of these viewers, Perhaps none were issued. The earliest patent I could find to mention the prismatic system is U.S. Pat. No. 174,893, Mar. 21, 1876, which states "These glasses are known as prismatic lenses, that is, they are double convex lenses, divided transversely, and so set that their thin edges are toward each other.",The drawing barely shows this in the patent. In U.S. Pat. No. 88,769, Mar. 27, 1877 it states "the lenses are of usual character", and since the drawings clearly show the prismatic lenses, it can be assumed they were in general use at that early date.

SUMMARY OF THE INVENTION

This invention is to improve apparatus for viewing stereoscopic prints, together with prints for use with this apparatus. Two conditions must be met for optimum viewing of such prints. First, the angle of view should match the angle of view used in taking the photographs. For most satisfactory perspective and stereoscopic realism, this angle should be about 48 degrees. A more narrow angle than used in taking the photographs will result in an exaggerated stereoscopic effect. While this may be interesting, it will intrude on the realism of a scene. The second condition is that the scenes must appear sharp throughout, and free from noticeable distortion or optical abberations.

The nearest viewing distance for normal eyesight is about 10 inches. Without magnification, this translates at the perferred 48 degree angle of view into a print width of about 6 inches, or 12 inches for a stereoscopic pair. These large prints would be expensive to produce, inconvenient to carry, and would require a bulky optical device to reduce the 6 inch separation to the 2 ½ inch separation of normal eyesight. At the other end of options would be prints 2 ½ inches wide. These would be too small for non-stereoscopic use to compete with "Jumbo" size snapshots. Worse, at the almost 2.6 times magnification for the requisite 48 degree angle of view, simple lenses would not give satisfactory images and far more expensive lenses would be required. Even with these, commonly available photographic color papers would not give satisfactory definition. Additionally, it is contemplated that much of the use of the viewers would be with prints reproduced in quantity by printing processes, generally by offset lithography. The finest generally available halftone screens for such printing are about 300 lines per inch. At the 2.6 times magnification necessary for 2.5 inch wide prints, the screen would appear too course for quality viewing.

An old invention (see "Prior Art") addresses the problem to permit the stereoscopic viewing of prints moderately wider than 2 ½ inches. In the system of this invention, the center of the lenses are moved outward from the center of the user's eyes. This moves the center of the prints outward, with the lenses acting as prisms. By doing this, print sizes competitive with "Jumbo",- snapshots can be used. These can, if desired, be cut apart for non-stereoscopic use.

The development of RC (resin coated) photographs yields prints which remain reasonably flat and rigid enough to be self supporting, which permits holding them flat with a simple gripper.

My improved stereoscopic print viewer occupies room for all the functions required for optimum viewing into a folded space 15/16 inches thick, by 1 ¾ inches wide, by 2 ¾ inches high, and a weight of 2 ounces.

The entire viewer can be injected molded of thermoplastics, except for two fasteners such as tubular rivets, two small compression springs, and two roll pins. It can be produced at a fraction of the cost of any other quality viewer.

The two lenses in their frames fold flat to a center plate which also acts as a light baffle to separate the viewing of the stereo pairs. Two screws, one right hand threaded and the other left hand, move the frames inward or outward for interoccular differences in human eyesight, and this adjustment can be made with thumb and a finger of either hand, within one total revolution. For compactness, semi-rigid strips curl back into the viewer for carrying, and pull out for focusing. Pushing a single button unlocks the position. Release of the button automatically locks the position. A gripper at the end of the focus strips holds the prints, and a notch at the bottom of the prints, centered between the stereoscopic pairs, fits into a boss in the gripper, for alignment.

Indexing means are provided to hold the lenses and their frames into a closed position, or open 90 degrees to a viewing position, Opening one lens 180 degrees gives a hand held 2 times magnifier. Opening the second lens 180 degrees gives 4 times magnification.

BRIEF DESCRIPTION OF THE DRAWINGS

FIG. 2 is an isometric view from the left side to show how compact the viewer is for transporting, and is scaled to appear about actual size in a final patent.

FIG. 3 is a sectional view showing how the lenses are indexed from a closed to a viewing or to a magnifier position.

FIG. 4 is a sectional view showing one pivot and one lens frame.

FIG. 5 is a sectional view showing one nut with its pivot, screw, lens frame, locking bar, focus tape and its recess, and the print gripper.

FIG. 6 is a sectional view from the top, showing the pivot, part of the lens frame, part of the screws and tape recesses, the lock bars and unlock button.

FIG. 7 is a sectional view looking from the front, showing the screw threads for interoccular adjustment, and the center plate with the bearing hole in which the screws rotate.

FIG. 8 represents a stereoscopic print reduced in size, showing the locating notch, and the black borders which reduce or eliminate a need for light baffles in the viewer.

DETAILED DESCRIPTION OF THE PREFERRED EMBODIMENTS

Figure 1:
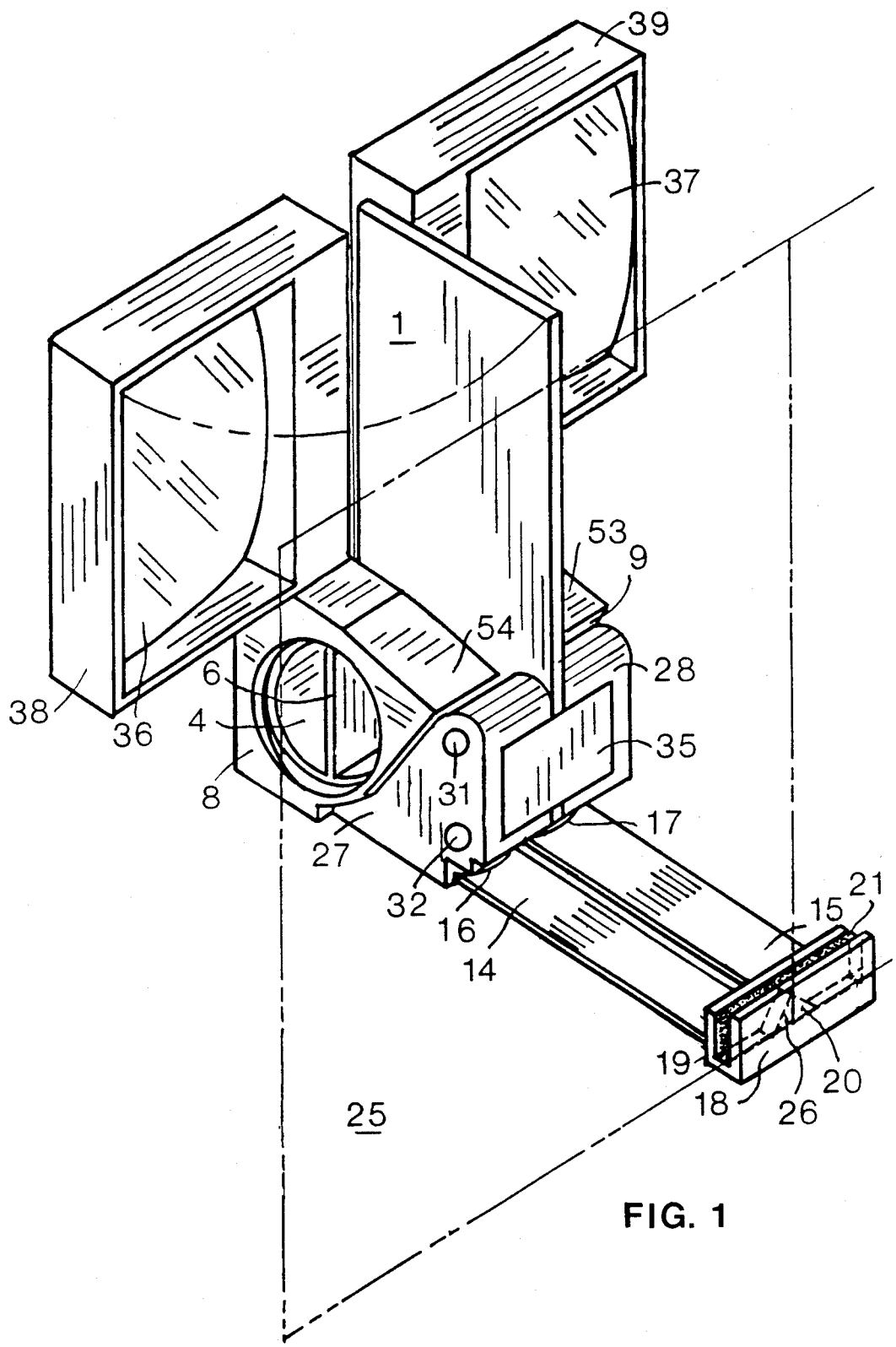
FIG. 1 is an isometric view of the Print viewer looking toward the user, with the lenses indexed for viewing, and with a phantom outline of a print in place and centered with the notch in the phantom print mating with the boss in the print holder.

Although the disclosure hereof is detailed to enable those skilled in the art to practice the invention, the physical embodiments herein disclosed merely exemplify the invention, which may be embodied in other specific structure. While the best known embodiment has been described, the details may be changed without departing from the invention, which is defined by the claims.

All of the parts except print 25, FIG. 8, and the cross member 18, FIGS. 1, 2, and 5 are on one or the other side of center plate 1, FIGS. 1, 2, 6, and 7, and are either identical parts or mirror parts. In order to avoid confusion as to which is right and which is left, these parts are numbered and described interchangeably and it is obvious from the drawings which is intended.

In addition to providing support for the other parts, center plate 1 acts as a light baffle to separate the stereoscopic pairs in viewing. Bearing hole 2, FIGS. 6 and 7, is provided in this center plate.

Two interoccular screws, 3 and 4, FIGS. 1, 2, 5, 6, and 7, are provided. These screws are tubular cups, with bottoms formed so that when the bottoms are joined together, either adhesively or mechanically, short shaft 5, FIG. 7, is formed, to be only as long as the thickness of center plate 1. Short shaft 5 rotates in bearing hole 2, FIG. 7, with a screw on each side of center plate 1. Screw 3 has right hand, and screw 4 left hand threads. On the inside of the cups which form screws 3 and 4 are molded webs 6 and 7, FIGS. 1, 2, 5, and 7, which enable the screws to be turned together with a thumb and finger of either hand, on either side of center plate 1. Two nuts, 8 and 9, FIGS. 1, 2, 5, 6, and 7 are provided with threads to mate with those of screws 3 and 4. The threads have a shallow profile to occupy minimum space, and they have 5 threads per inch, with one revolution of each screw giving a 0.200 inch lateral movement, for a total movement between nuts 8 and 9 of 400 inch, which is sufficient adjustment for interoccular variations in individual vision. Between the threads of nuts 8 and 9, FIGS. 5 and 6, and the outside of the nuts are provided circular channels 10 and 11, FIG. 5 and 7, which face toward center plate 1. Guides 12 and 13, FIG. 7, which correspond to channels 10 and 11, are molded into center plate 1 on each side.

In channels 10 and 11, FIGS. 5 and 7 and guides 12 and 13, FIG. 7, can be curled semi-flexible strips 14 and 15, FIGS. 1 and 5, which are similar to those in steel rule tape measures, but preferably molded of nylon. Strips 14 and 15 as molded are straight, except for a cross sectional curve to increase rigidity. Upon curling into the viewer, stresses flatten this curve.

These strips 14 and 15 can be pulled out or pushed in through openings 16 and 17, FIG. 1 and guides 29 and 30, FIG. 5, at the bottom and toward the print side. Cross member 18, FIGS. 1, 2, and 5 is molded integral with strips 14 and 15 to hold the strips together and parallel to each other, with a space between equal to the thickness of center plate 1. In the top of cross member 18 is formed cross member channel 19, FIGS. 1, 2, and 5.

In cross member channel 19, on the back side away from the strips, is molded "V",shaped boss 20, FIG. 1, with the base of the "V",downward. Into cross member channel 19 is affixed spring rubber 21, FIGS. 1, 2, and 5. At the bottom of stereoscopic print pair 25, FIG. 8, centered between the pairs, is "V",notch 26, mating with "V",boss 20 in cross member channel 19, FIG. 1.

Housings 27 and 28, FIGS. 1, 2, 5, and 6 have housing strip guides 29 and 30, FIG. 5, which are slots at the bottom toward cross member 18. Tubular rivets 31 and 32, FIGS. 1, 2, and 5, hold housings 27 and 28 to center plate 1, with a housing on each side. Pivoting on top tubular rivet 31, inside housings 27 and 28, are locking bars 33 and 34, FIG. 5. Without stress to bend them, as molded of nylon, locking bars 33 and 34 are straight from where they pivot on rivet 31 downward to semiflexible strips 14 and 15 entered into housing strip guides 29 and 30. When without stress to bend them, locking bars 33 and 34, Fig. 5, are of a length to exert pressure on strips 14 and 15 to lock the strips.

Lock release button 35, FIGS. 1, 2, 5, and 6 is held in place by housings 27 and 28 near the center of locking bars 33 and 34, FIG. 5. When pressure on button 35, such as from a finger, is applied toward locking bars 33 and 34, a boss on release button 35 pushes against locking bars 33 and 34, to bow them, and the geometrics of this action shortens locking bars 33 and 34 so their ends no longer press against strips 14 and 15, which can thus be retracted or extended from housings 27 and 28 and nuts 8 and 9.

Release of pressure on lock release button 35 permits locking bars 33 and 34 to return to their straight form as molded, which again locks strips 14 and 15. The action is similar to a toggle clamp, except that it is jointless, and the locking pressure is applied by the stiffness of the locking bars.

The two lenses, 36 and 37, FIG. 1, and 2, are injection molded of polysterene or other plastics. They could be of ground and polished glass at greater cost and weight, but of greater durability. For 2 times magnification, the focal length is 5 inches, and for 3.2 inch wide prints with a 0.200 strip between the pairs, the centers of the lenses must be offset 0.6 inches horizontally. Lenses 36 and 37 are rectangular, each are 1.260 wide horizontally, and 1.5 inches long, vertically. They are plano-convex, with the plano side toward the observer.

Lenses 36 and 37 are press fit or cemented into frames 38 and 39, FIG. 1 and 2. The edges of the frames mask off the lenses 1/16 inch all around. The thin edges of lenses 36 and 37 are mounted toward center plate 1, FIGS. 1 and 2. On the sides of lens frames 38 and 39, FIGS. 3 and 5, are molded hollow recepticales 59 and 60, FIGS. 3, 5, and 6, of a width to occupy, with frames 38 and 39, a 0.230 inch center to center lens opening distance, when adjusting screws 3 and 4 are rotated for a closed position, with lenses 36 and 37 indexed open for viewing. At the top of receptacles 59 and 60 are holes 46 and 47, FIGS. 3 and 5, and at the bottom are holes 55 and 56, which act as bearings for shafts 48 and 49 which are molded onto nuts 8 and 9. Shafts 48 and 49 are molded upward above the edges of nuts 8 and 9 on the side toward the observers' eyes. Nuts 8 and 9 are held from rotation by housings 27 and 28, FIGS. 1, 2, 5, and 6. At the bottom of and around bearing holes 55 and 56, FIGS. 3, and 5, and molded into lens frames 38 and 39, are four cam forms, FIGS. 3 and 4, which provide equally spaced downward lips. Molded into nuts 8 and 9, FIGS. 3 and 4, where shafts 48 and 49 join them, are forms which mate into the lip cams as shafts 48 and 49 are assembled through bearing holes 55 and 56, FIGS. 3 and 5. Compression springs 44 and 45 are placed overshafts 48 and 49 so springs 44 and 45 are inside receptacles 59 and 60, FIGS. 3, 5, and 6. Shafts 48 and 49 are then entered into bearing holes 46 and 47 at the top of frames 38 and 39 and the frames will then pivot on shafts 48 and 49. Holes 57 and 58, FIGS. 3 and 5, are provided in shafts 48 and 49, and springs 44 and 45 are compressed toward the bottom of receptacles 59 and 60, FIGS. 3 and 5 and roll pins 50 and 51 are inserted in holes 46 and 47 to hold springs 44 and 45 under compression. The mating forms between nuts 8 and 9 and frames 38 and 39 then serve to index frames 38 and 39 into place at each 90 degrees rotation to nuts 8 and 9.

Angles 53 and 54 on nuts 8 and 9 are to prevent nuts 8 and 9 from interfering with the view between lenses 36 and 37 and print 25. Tops of housings 27 and 28 are made low enough to prevent similar interference in viewing. Print 25, FIG. 1, and 8 has "V" notch 26 at the bottom, centered between the stereoscopic pairs. The stereoscopic images are individually 3.2 inches wide, and 4 inches high, excluding borders. Provided around the images is a 0.200 inch wide center mask 22, a 0.100 inch wide black mask as left border 23, a 0.100 inch wide black mask as right border 42, a 100 inch wide black mask as top border 43, and a 0.200 inch wide black mask as bottom border 24, all in FIG. 8. The total size for the stereoscopic pair with borders is 6.8 inches wide by 4.3 inches high. These black borders appear as a black window in the stereoscopic view, eliminating or reducing the need for light baffles in the viewer. A fine white line 61, or a dotted line centered between the stereoscopic pairs on either the front or back side of print 25, FIG. 8, is provided to guide cutting the pairs into ordinary snapshots.

In addition to print viewing, this apparatus can be used as a hand held magnifier by indexing either lens 180 degrees from its closed position, for 2 times magnification. By indexing both lenses 180 degrees, it becomes a 4 times magnifier.

I claim:

1. In a stereoscopic print viewer, a pair of magnifying lenses moveably mounted to a structure, a center plate positioned between said viewer lenses to hold said structure, a means to move said lenses to fold flat upon said centerplate, a means to unfold said lenses back into viewing position, a means for holding a stereoscopic print pair in position to be viewed through said lenses, and a means to retract into said structure said means for holding said stereoscopic print pairs.

2. A viewer of claim 1 in which the lenses can be moved apart to adjust for interoccular differences in human eyesight.

3. A viewer of claim 1, in which the means for holding a stereoscopic print pair is shorter than the outside width of said print pair, and has indexing means which mates with indexing means on said print pair to positively position said print pair for viewing.

4. A stereoscopic print which has indexing means which mates with the indexing means of the viewer in claim 3.

5. A viewer of claim 1, in which the means for holding a print is at least one strip which is confined at one end in the structure of said viewer and has a print holder attached to the free end of said strip, with said strip with a curvature centered parallel to said strip, with the thickness of said strip, in conjunction with the materials strength and curvature of said strip, sufficient to support a stereoscopic print pair and its holder, when said strip with said holder is extended to viewing position out from said structure; and with said strip thin and flexible enough to permit said strip to be curled into said structure as said strip is retracted into said structure of said viewer.

6. In the viewer of claim 5, means in which pressure on a member releases locking of the strip, permitting movement to viewing or retracted position, and release of said pressure on said member locks said strip in a desired position.

7. A viewer of claim 1, in which the means for holding a stereoscopic print pair is shorter than the outside width of said print pair, and with said means for holding having one or more bosses which mate with one or more notches in said stereoscopic print pair to give positive location for proper viewing position of said stereoscopic print pair.

8. A stereoscopic print pair of claim 7 with one or more notches in a border or borders or at the edge of the images of said stereoscopic print pair, with said notch mating with a boss in the holder of a stereoscopic print viewer to give positive location to said stereoscopic print pair for proper viewing position in said stereoscopic print viewer.

9. A stereoscopic print pair of claim 7 with a single notch centered between said stereoscopic print pair, in a bottom and center border, said notch mating with a boss in a print holder of a stereoscopic print viewer to give positive location to said stereoscopic print pair for proper viewing position in said stereoscopic print viewer.

10. In the viewer of claim 1, means to index the swing of said lenses from a closed position parallel to said plane of said center of said viewer, to 90 degree open positions for viewing, or to index each of said lenses a further 90 degrees for use as a hand magnifier, with each position held by spring pressure operating against mating restraining surfaces.

* * * * *